(12) United States Patent
Cotton

(10) Patent No.: US 6,318,059 B1
(45) Date of Patent: Nov. 20, 2001

(54) MOWER AND REEL WITH AXIALLY OFFSET CHEVRON BLADE APEXES

(75) Inventor: Donald F. Cotton, Andalusia, AL (US)

(73) Assignee: Bush Hog, L.L.C., Selma, AL (US)

(*) Notice: Subject to any disclaimer, the term of this patent is extended or adjusted under 35 U.S.C. 154(b) by 0 days.

(21) Appl. No.: 09/493,973

(22) Filed: Jan. 28, 2000

(51) Int. Cl.⁷ ............................................. A01D 34/47
(52) U.S. Cl. .................................... 56/251; 56/294
(58) Field of Search ........................... 56/251, 7, 294, 56/167, 249, DIG. 20; 241/236, 282.2

(56) References Cited

U.S. PATENT DOCUMENTS

| | | | |
|---|---|---|---|
| 2,528,116 | * 10/1950 | Clemson | 56/249 |
| 3,873,038 | * 3/1975 | Wagstaff | 241/282.2 |
| 3,979,887 | * 9/1976 | Stewart | 56/13.5 |
| 4,192,103 | 3/1980 | Sousek . | |
| 4,485,591 | 12/1984 | Bolin . | |
| 4,644,737 | * 2/1987 | Arnold | 56/249 |
| 5,291,724 | 3/1994 | Cotton . | |
| 5,321,912 | 6/1994 | Neary et al. . | |
| 5,477,666 | 12/1995 | Cotton . | |
| 5,511,365 | * 4/1996 | Rice | 56/7 |
| 5,678,398 | * 10/1997 | Fox et al. | 56/226 |
| 5,725,415 | 3/1998 | Bernhard . | |
| 5,879,224 | 3/1999 | Pilger . | |
| 5,893,792 | 4/1999 | Scott . | |

* cited by examiner

Primary Examiner—Robert E. Pezzuto
Assistant Examiner—Árpád Kovács
(74) Attorney, Agent, or Firm—Cook, Alex, McFarron, Manzo, Cummings & Mehler, Ltd.

(57) ABSTRACT

A foliage mowing apparatus and mowing reel assemblies include a plurality of helically shaped blades which are mounted circumferentially with respect to each other. Each blade has a chevron-type junction or apex lying within a radially extending plain which is transverse to the longitudinal axis of the reel. Apexes of adjacent blades do not lie along the same radial plane. Instead, each apex is axially spaced from each of its adjacent apexes. With this structure, if a piece or blade of grass passes uncut through an apex area, a straight blade section follows immediately in order to cut or trim this piece or blade of grass.

34 Claims, 2 Drawing Sheets

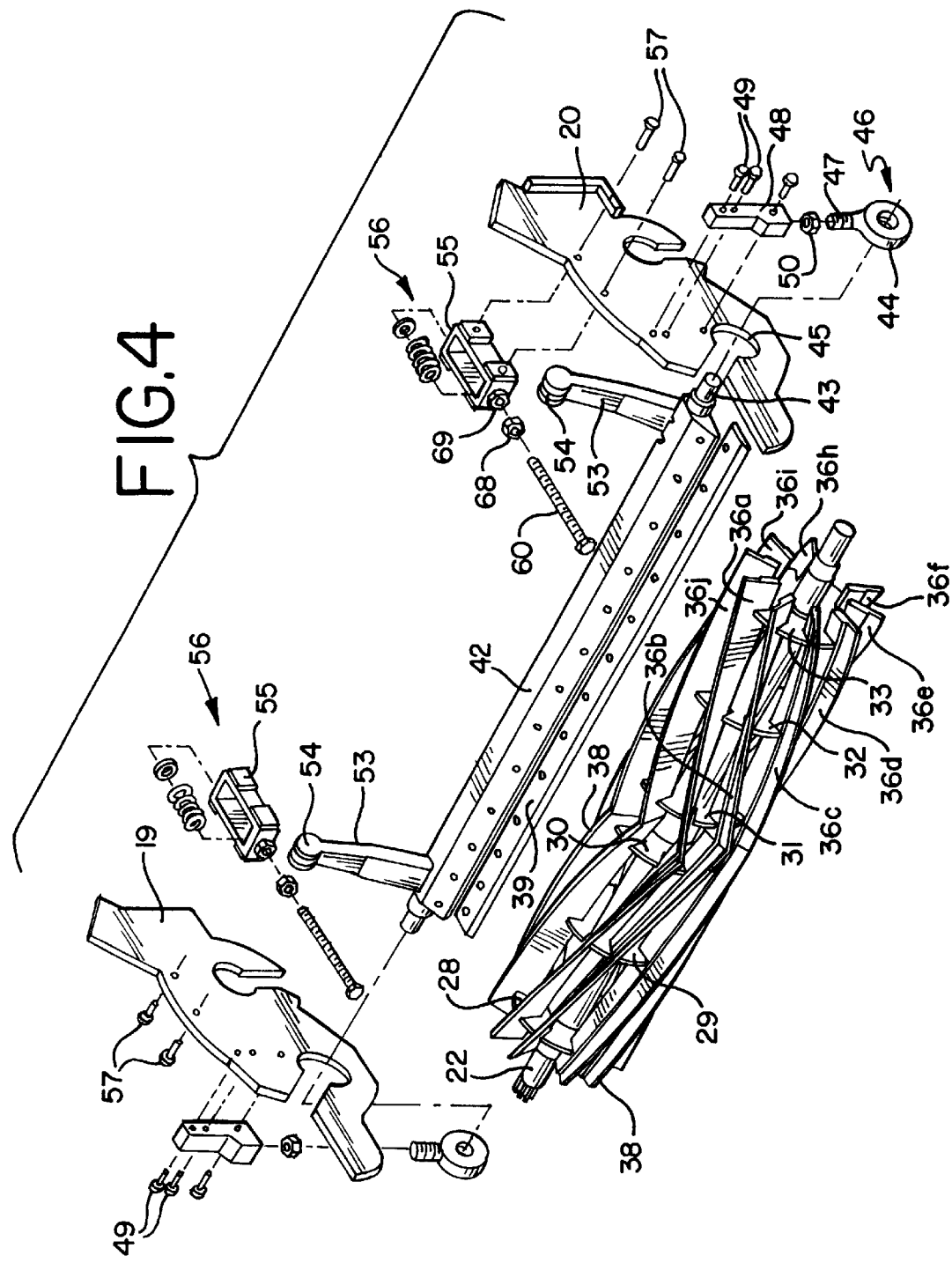

MOWER AND REEL WITH AXIALLY OFFSET CHEVRON BLADE APEXES

DESCRIPTION

BACKGROUND OF THE INVENTION

This invention generally relates to improved mower reel units and mowing devices incorporating such units. More particularly, reel mowers and reel mower units are provided which achieve superior consistent cutting which avoids even the smallest of cutting irregularities along the reel. The reel blades are generally chevron-shaped and have chevron apexes. Respective apexes of adjacent blades are not in alignment with each other.

Reel mowers and reel mower units having chevron-shaped blades are generally known. Such chevron-shaped blades can be constructed of blades mounted in blade pairs in a generally end-to-end manner such that the paired blades meet at an obtuse angle with respect to each other, thereby providing a junction in the nature of a chevron or the apex of a chevron.

Reel mowers and reel mower units of this overall chevron type are illustrated in Cotton U.S. Pat. No. 5,291,724 and U.S. Pat. No. 5,477,666. The subject matter of each of these patents is incorporated by reference hereinto. As will be apparent from information such as these patents, various measures have been taken to improve the cutting properties of reel mowers, particularly those having chevron-shaped reel mower units. Steps which previously had been taken along these lines include adding biasing units directed toward maintaining a constant, uniform pressure between the chevron-shaped reel blades and the bedknife of the mower while the blades move over the bedknife. These types of devices can be further refined by adding a sensor which communicates with the biasing means in order to adjust the contact pressure of the biasing means in response to changing conditions. A feedback signal can be provided in order to adjust the pressure to a pre-selected value.

Despite the improvements which are proposed by proposed enhancements such as those of these patents, these types of reel units fall short of meeting stringent mowing requirements. An example will serve to illustrate the stringent requirements which are met by the present invention but which have not been achieved heretofore. The example is in golf course maintenance. While reliable mowing is important for golf course fairways, the standards to be adhered to are less stringent that those for the mowing of golf course greens. Greens of professional golf courses which are supervised by the most demanding of professional groundskeepers are scrutinized on a daily basis to insure a uniform cut throughout the green. It has been found that, without benefit of the present invention, variations in grass blade height can be detected by a professional groundskeeper. It is this cutting inconsistency which is successfully addressed by the present invention.

SUMMARY OF THE INVENTION

In accordance with the present invention, important advances are achieved in the cutting effectiveness and consistency of chevron-style reel mowers and reel mower cutting units. The chevron-shaped blades exhibit an obtuse angle configuration at which a blade apex is defined. The respective apexes of adjacent chevron-shaped blades are in intentional axial misalignment with each other so that the apex of one blade is spaced axially away from the apex of each blade which is circumferentially adjacent to it. In an embodiment which is illustrated, the adjacent apexes of the chevron-shaped blades alternate between locations which are offset to the left of a radial plane with those which are offset to the right of that radial plane.

It is accordingly a general object of the present invention to provide improved mower reels having enhanced cutting abilities.

Another object of this invention is to provide improved mower reels which achieve exceptionally uniform grass blade cutting which makes virtually undetectable deviations in cut length of grass blades.

Another object of the present invention is to provide improved reel mowers and reel mower units which are of a chevron type and which are for professional trimming of championship golf course greens.

Another object of the present invention is to provide improved chevron-type mower reel units which enhance the long-term performance of self-adjusting reel features.

Another object of this invention is to provide an improved chevron reel system which insures a high quality cut at all times and along the full length of the reel.

Another object of the present invention is to provide a chevron reel mower system which provides blade spacing that minimizes or eliminates any harmonic imbalances.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 4 is an exploded perspective view showing the reel unit, together with a typical bedknife mounting assembly and adjusting assembly.

DESCRIPTION OF THE PREFERRED EMBODIMENTS

Figure 1:
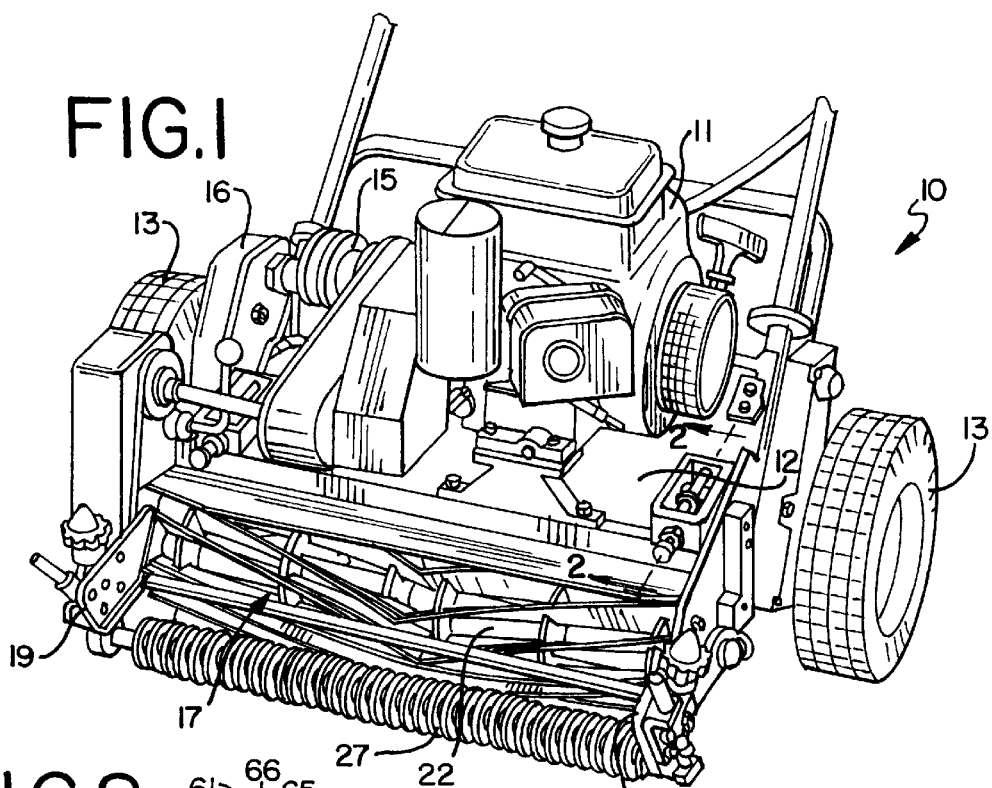
FIG. 1 is a perspective view of a self-propelled driven lawnmower including a reel in accordance with the present invention, such being an example of a mower within which the reel of the present invention can be utilized.

It will be appreciated that the particular embodiment of a mower unit which is shown in the drawings and discussed in some detail herein is a self-propelled driven lawnmower. It will be understood that the cutter reel assemblies which are described herein are likewise suitable for use in multiple-unit and multiple-deck mowers, whether they are self-propelled, or whether they are pulled or pushed by a propelling unit such as a tractor or other motive apparatus. The invention is not limited to use in the self-propelled mower which is described herein for illustrative purposes. Devices or implements having multiple reel units also are contemplated.

Illustrated mower 10 includes a gasoline-powered engine 11 mounted upon a chassis 12. A pair of wheels 13 facilitate ground-engaging transport of the mower. For a self-driven unit, the wheels are coupled to the motor and drive shaft 15 through a power transmission 16. A reel unit, generally designated 17, is rotatably suspended between two side plates 19 and 20 that are secured to the mower frame by any suitable means such as mounting bolts.

The illustrated reel unit contains an axially disposed shaft 22 that is supported within suitable bearing blocks carried by the side plates. Suitable means are provided for driving the shaft 22. A roller unit 27 is shown suspended between the side plates at the front of the mower which rides in contact with the ground forward of the reel unit. As is well known in the art, the height of the roller unit may be adjusted to regulate the cutting height of this particular type of mower.

With more particular reference to the reel unit 17, this includes a plurality of reel discs. For illustrative purposes, six such discs are shown at 28, 29, 30, 31, 32 and 33. Each is securely mounted, such as by welding, to the axially disposed reel shaft 22. Each disc rotates with the shaft. A plurality of cutting blades 36a, 36b, 36c, 36d, 36e, 36f, 36g, 36h, 36i and 36j are secured to the discs. In the illustrated embodiment, this securement is generally to the outer periphery of the discs. As is customary for these types of chevron-shaped blades, each is helical in form and is twisted along its length. In an illustrated arrangement, each blade is twisted about 45° through ten inches of blade length. Other suitable helical patterns can be practiced.

Each cutting blade 36a through 36j is composed of two principal sections which form the general chevron shape which is characteristic of this type of blade. These can be considered as blade pairs mounted in a generally end-to-end manner such that the blades of the blade pair meet at an obtuse angle with respect to each other in order to provide a blade junction or chevron apex for each blade pair or chevron-shaped blade. In the drawings, junctions or apexes 37a, 37b, 37c and 37d are visible. It will be appreciated that each of the remainder of the blades has a similar junction or apex. The blades are spaced generally circumferentially with respect to each other along the reel unit. Each blade is sharpened in a conventional manner to provide a cutting edge 38 which moves across a bedknife 39 as the reel rotates. Bedknife 39 is pivotally suspended between the two side plates 19 and 20 in this embodiment.

Figure 2:
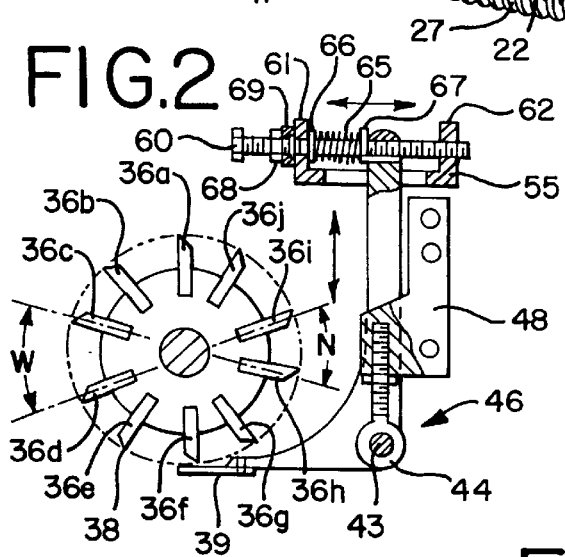
FIG. 2 is a partial side elevation and a partial section showing the reel and bedknife mounting arrangement used in the mower illustrated in FIG. 1.

FIG. 2 provides further details of the bedknife unit. That which is illustrated is of a conventional design and is attached to an elongated support bar 42 (FIG. 4) by means of screws. Each end of the bar is equipped with trunnions 43, which pass through openings 45 in the side plates and are supported for rotation in adjustable bearing unit 46. Each bearing unit includes a bushing 44 which is fitted onto one of the trunnions and a threaded shank 47 which is screwed into a support block 48. The support block is securely mounted on the outside of the adjacent side plate by screws 49 in this illustrated embodiment. Also shown is a lock nut 50 threaded into shank 47 of each bearing unit which, in assembly, is locked against the bottom wall of the support block to hold the bushing and thus the bedknife at a desired location with respect to the reel unit.

A pair of rocker arms 53 extend upwardly from the opposite ends of the bedknife support bar 42. A bifurcated member 54 is located at the distal end of each rocker arm. When assembled, the bifurcated members are movably mounted inside rectangularly shaped brackets 55 of adjusting units 56. Each bracket is secured to the inside wall of side plates 19 and 20 such as with screws 57.

Further details of the features provided by the components associated with the brackets 55 are illustrated in FIG. 2. A bolt 60 is threaded into opposing end walls 61 and 62. The shank of the bolt is arranged to pass through the two raised arms of the bifurcated member 54 situated in the housing. A compression spring 65 encircles the bolt shank and is adapted to act between the end wall 61 of the bracket and the bifurcated member. A washer 67 is mounted between the spring and the bifurcated member. A spring backer 66 can be axially fixed in position with respect to the shank of the bolt in order to abut a backside of the spring 65. By turning the bolt within the bracket, the position of the backer 66 is changed, which compresses or relieves the spring 65 against the washer 67 and the bifurcated member 54. Thus the biasing force of the spring exerted upon the rocker arm, and thus the bedknife, can be accurately adjusted. A lock nut 68 also is threaded on the bolt shank which acts against a raised pad 69 on the bracket to lock the bolt in a desired position.

Bedknife 39 is brought into contact with the blades of the reel using the adjustable bearing units 46. When the proper adjustment has been obtained, the bearing units are locked in place. The chevron-shaped blades 36a through 36j rotate with the shaft 22 in a counter-clockwise direction as viewed in FIG. 2. It will be noted that the junctions or apexes of the blades do not lie along the same radial plane passing through the longitudinal axis of the shaft 22. Instead, in the illustrated embodiment, one junction or apex 37a lies along a first radial plane A, while adjacent junction or apex 37b lies along a second radial plane B. Each plane A and B is on either side a center plane C. In the illustrated embodiment, each plane A and B is substantially equally spaced from center plane C, but in opposite directions. It will thus be seen that, in this illustrated embodiment, junction or apex 37a lies along first radial plane A, junction or apex 37b lies along second radial plane B, junction or apex 37c lies along first radial plane A, junction or apex 37d lies along second radial plane B, and so forth.

It has been found that alternating the junction or apex of adjacent chevron-shaped blades is especially effective in achieving uniform cutting of even the smallest of cut lengths, for example the cut-off length of a single overnight growth. Typically, these cut-off lengths will be as short as about 0.005 inch. These cut-off lengths can be achieved on grass blades having a height of no more than about 0.08 inch. Of course, the invention also works exceptionally well on longer grass blades and for longer cut-off lengths. The illustrated extremely short lengths are typical for championship golf greens being tended by the most demanding of professional groundskeepers.

With more particular reference to the action achieved by the axially misaligned blade junctions or apexes, it will be appreciated that, because of the generally chevron shape at the junction or apex of each blade, there is a sharp change in blade section direction. This change in blade direction allows for a grass blade, or a few or several grass blades, to pass uncut through the area where the two mower blade components join at the junction or apex. With the present invention, the adjacent chevron-shaped blade will immediately thereafter cut the missed grass blade or blades because an uninterrupted and relatively straight section of this next adjacent blade will engage the uncut grass between same and the bedknife, thereby cutting or trimming this grass piece or the grass blades which had not been properly cut by the immediately adjacent preceding junction or apex portion of the chevron blade.

Figure 3:
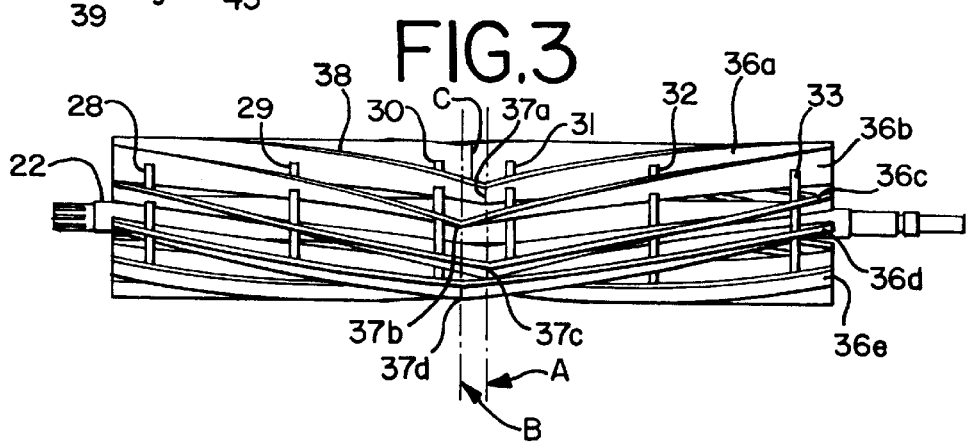
FIG. 3 is an elevational view of a mower reel unit according to the invention.

Referring more specifically to the illustrated embodiment, a piece or blade of grass, or multiple pieces or blades of grass would typically be left uncut or improperly cut by the natural cutting gap or gaps which exist between chevron blade junction or apex 37d of the blade 36d and the bedknife 39. Junction or apex 37d is generally at radial plane A. As reel unit rotation continues, the same grass piece or blade, or grass pieces or blades will be instanteously thereafter cut between the bedknife 39 and the relatively straight-edged portion of chevron blade 36c which is intersected by radial plane B, as can be visualized from FIG. 3. At virtually the same time, another grass piece or grass pieces will be uncut or incompletely cut between the bedknife 39 and the junction or apex 37c of chevron blade 36c, this being generally at the radial plane A. continuing, these thus uncut or improperly or incompletely cut grass pieces will be subsequently and almost immediately severed between the bedknife and the substantially straight portion of the reel blade 36b which lies along this radial plane A. This following clean cut function continues as the blade unit continues to rotate.

It is important to note that this advantageous result is achieved because each piece or blade of grass is engaged by a straight section of a reel blade, even those grass pieces in the area of the axial center of the reel blade unit. Substantially no piece or blade of grass is presented for cutting by only a junction or apex of a reel blade. The present invention makes possible this consistent cutting action between straight sections of a reel blade and a bedknife which occurs along the full length of the blades.

While the substantially consistent alternating of the junctions or apexes which is illustrated in the present drawings has been found to be especially suitable and effective, other spacing specifics can be practiced provided each junction or apex is immediately followed, during cutting rotation of the reel unit, by a substantially straight blade section of the following blade. For example, the junctions or apexes can lie along one of three or more radial planes which are axially spaced from each other. Such axial spacing typically will be at least about 0.5 cm (about 0.2 inch). This spacing can be at least about 1 cm (about 0.4 inch). A typical maximum spacing is up to about 10 cm (about 4 inches).

Nevertheless, the illustrated arrangement has certain construction and assembly advantages. For example, only two types of chevron blades are needed, and the reel discs 28, 29, 30, 31, 32 and 33 can each be of the same construction and configuration. With more particular reference to the illustrated reel discs, each has slots which are used to space the chevron blades around the reel unit. The slots are spaced around the reel disc in a pattern so that the spacing of the blades will alternate between a wide space and a narrow space. With more particular reference to the illustrated embodiment, the wide space between slots is such that those adjacent slots are spaced radially by 42°. This is illustrated at angle W in FIG. 2. FIG. 2 also illustrates the narrower angle N, which in the illustrated embodiment is 30°. It will be appreciated that, if additional blade configurations were utilized, such as if they have a junction or apex different from that of the illustrated embodiment, such would increase the manufacturing complexity and cost.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A foliage mowing apparatus, comprising:
   a frame, said frame being transportable over foliage to be mowed;
   a bedknife supported by said frame;
   a reel unit rotatably mounted with respect to said frame, said reel unit and said bedknife being in foliage cutting relationship with each other;
   said reel unit having a longitudinal axis and a series of spaced-apart, radially disposed discs and a plurality of helically shaped blades mounted upon the outer periphery of said discs, and said blades rotate through a cutting sweep to and beyond said bedknife in order to cut foliage between the blades and bedknife when the mowing apparatus is in operation;
   said helically shaped blades being mounted in blade pairs in a generally end-to-end manner such that the blades of the blade pair meet at an obtuse angle with respect to each other to provide a blade junction between a straight section of one blade and a straight section of the other blade of its blade pair, said reel unit having a plurality of said blade junctions and blade pairs spaced generally circumferentially with respect to each other along the reel unit;
   the respective junctions of adjacent blade pairs are in an axial misalignment with each other such that the junction of one blade pair is spaced axially away from the junction of each blade pair which is adjacent thereto; and
   a radial plane normal to said longitudinal axis which passes through at least one of said blade junctions also passes through at least said blade straight section which follows this said blade junction during operation of the mowing apparatus, whereby each cutting sweep of this said blade junction is followed by a cutting sweep of said blade straight section which follows this said blade junction.

2. The foliage mowing apparatus in accordance with claim 1, wherein each junction lies generally along a radial plane passing through the longitudinal axis, and at least two of said radial planes are provided, and adjacent junctions are at different said radial planes.

3. The foliage mowing apparatus in accordance with claim 2, wherein said radial planes are separated by an axial distance of at least about 0.5 cm.

4. The foliage mowing apparatus in accordance with claim 2, wherein two of said radial planes are provided, and every other blade junction lies generally along one of said radial planes, while the remaining blade junctions lie along the other said radial plane.

5. The foliage mowing apparatus in accordance with claim 4, wherein said reel unit has a mid-point radial plane, one of said two radial planes is spaced a distance to the left of said mid-point, and the other of said two radial planes is spaced a distance to the right of said mid-point radial plane.

6. The foliage mowing apparatus in accordance with claim 5, wherein each said distance is approximately the same.

7. The foliage mowing apparatus in accordance with claim 5, wherein each said distance is between about 0.5 cm and about 10 cm.

8. The foliage mowing apparatus in accordance with claim 1, wherein each of said discs includes a plurality of blade mount locations, alternating pairs of which are spaced apart by a narrow radial spacing, while the remaining pairs of blade mount locations are spaced apart by a wide radial spacing.

9. The foliage mowing apparatus in accordance with claim 1, further including a biasing assembly which maintains a contact pressure between the blades and the bedknife as the blades move over the bedknife.

10. The foliage mowing apparatus in accordance with claim 9, wherein said bedknife includes a trunnion that rotatably supports the bedknife such that the bedknife is movable into contact with the blades of the reel, and said biasing assembly acts against said bedknife to hold the bedknife against the blades with said contact pressure.

11. The foliage mowing apparatus in accordance with claim 1, where the said blade pairs are twisted in direction of rotation so that at least one blade pair is capable of contacting the bedknife at any time.

12. The foliage mowing apparatus in accordance with claim 1, wherein the blade pairs have a chevron shape at least at said blade junction.

13. A foliage mowing apparatus comprising:
 a frame, said frame being transportable over foliage to be mowed;
 a reel unit rotatably mounted with respect to said frame, said reel unit having a longitudinal axis and a plurality of generally chevron-shaped blades mounted thereon, each said blade having a chevron apex between straight blade sections of the chevron-shaped blades, each said blade rotating through a cutting sweep when the mowing apparatus is in operation;
 the respective apexes of adjacent chevron-shaped blades are in axial misalignment with each other such that the apex of one blade is spaced axially away from the apex of each blade which is circumferentially adjacent thereto; and
 a radial plane which passes through at least one of said apexes also passes through at least said blade straight section which follows this said apex during operation of the mowing apparatus, whereby each cutting sweep of this said apex is followed by a cutting sweep of said blade straight section which follows this said apex.

14. The mowing apparatus in accordance with claim 13, wherein each apex lies generally along a radial plane passing through the longitudinal axis, and at least two of said radial planes are provided, and adjacent apexes are at different said radial planes.

15. The mowing apparatus in accordance with claim 14, wherein two of said radial planes are provided, and every other blade apex lies generally along one of said radial planes, while the remaining blade apexes lie along the other said radial plane.

16. The mowing apparatus of claim 15, wherein said reel unit has a mid-point radial plane, one of said two radial planes is spaced a distance to the left of said mid-point, and the other of said two radial planes is spaced a distance to the right of said mid-point radial plane.

17. The mowing apparatus in accordance with claim 16, wherein each said distance is at approximately the same.

18. The mowing apparatus in accordance with claim 16, wherein each said distance is at least about 0.5 cm.

19. The mowing apparatus in accordance with claim 13, wherein said reel unit includes a series of spaced-apart, radially disposed discs, and wherein each of said discs includes a plurality of blade mount locations, alternating pairs of which are spaced apart by a narrow radial spacing, while the remaining pairs of blade mount locations are spaced apart by a wide radial spacing.

20. A reel unit for a foliage mowing apparatus, comprising:
 an axially extending longitudinal shaft;
 series of axially spaced-apart reel discs which are radially disposed along said longitudinal shaft;
 a plurality of helically shaped blades mounted upon the outer periphery of said discs, said blades being mounted in blade pairs in a generally end-to-end manner such that the blades of the blade pair meet at an obtuse angle with respect to each other to provide a blade junction between straight blade sections of the blade pair, said reel unit having a plurality of said blade pairs and straight blade sections spaced generally circumferentially with respect to each other along the reel unit;
 the respective junctions of adjacent blade pairs are oriented such that the junction of one blade pair is spaced axially away from the junction of each blade pair which is adjacent thereto; and
 a radial plane which passes through at least one of said blade junctions also passes through at least the blade straight section which follows this said blade junction during operation of the reel unit, whereby a cutting sweep of the blade junction is followed by a cutting sweep of one of the blade straight sections.

21. The reel unit in accordance with claim 20, wherein each junction lies generally along a radial plane passing through the longitudinal axis, and at least two of said radial planes are provided, and adjacent junctions are at different said radial planes.

22. The reel unit in accordance with claim 21, wherein two of said radial planes are provided, and every other blade junction lies generally along one of said radial planes, while the remaining blade junctions lie along the other said radial plane.

23. The reel unit in accordance with claim 22, wherein said reel unit has a mid-point radial plane, one of said two radial planes is spaced a distance to the left of said mid-point, and the other of said two radial planes is spaced a distance to the right of said mid-point radial plane.

24. The reel unit in accordance with claim 23, wherein each said distance is approximately the same.

25. The reel unit in accordance with claim 23, wherein each said distance is between about 1 cm and about 10 cm.

26. The reel unit in accordance with claim 20, wherein each of said axially spaced-apart reel discs includes a plurality of blade mount locations, alternating pairs of which are spaced apart by a narrow radial spacing, while the remaining pairs of blade mount locations are spaced apart by a wide radial spacing.

27. The reel unit in accordance with claim 20, wherein the blade pairs have a chevron shape at least at said blade junction.

28. A reel unit for a foliage mowing apparatus, comprising:
 an axially extending longitudinal shaft;
 a series of axially spaced-apart reel discs which are radially disposed along said longitudinal shaft;
 a plurality of chevron-shaped blades mounted upon the outer periphery of said discs, each chevron-shaped blade having a chevron apex between straight blade sections;
 the respective axes of adjacent chevron-shaped blades are such that the apex of one blade is spaced axially away from the apex of each blade which is circumferentially adjacent thereto; and
 a radial plane which passes through at least one of said apexes also passes through at least the blade straight section which follows this apex during operation of the reel unit, whereby a cutting sweep of the apex is followed by a cutting sweep of one of the blade straight sections.

29. The mowing reel unit in accordance with claim 28, wherein each apex lies generally along a radial plane passing through the longitudinal axis, and at least two of said radial planes are provided, and adjacent apexes are at different said radial planes.

30. The mowing reel unit in accordance with claim 29, wherein two of said radial planes are provided, and every other blade apex lies generally along one of said radial planes, while the remaining blade apexes lie along the other said radial plane.

31. The mowing reel unit in accordance with claim 30, wherein said reel unit has a mid-point radial plane, one of said two radial planes is spaced a distance to the left of said mid-point, and the other of said two radial planes is spaced a distance to the right of said mid-point radial plane.

32. The mowing reel unit in accordance with claim 31, wherein each said distance is approximately the same.

33. The mowing reel unit in accordance with claim 31, wherein each said distance is at least about 0.5 cm.

34. The mowing reel unit in accordance with claim 28, wherein each of said discs includes a plurality of blade mount locations, alternating pairs of which are spaced apart by a narrow radial spacing, while the remaining pairs of blade mount locations are spaced apart by a wide radial spacing.

* * * * *

UNITED STATES PATENT AND TRADEMARK OFFICE
CERTIFICATE OF CORRECTION

PATENT NO.    : 6,318,059 B1
DATED         : November 20, 2001
INVENTOR(S)   : Cotton It is certified that error appears in the above-identified patent and that said Letters Patent is hereby corrected as shown below:

<u>Title page, Item [54] and Column 1, line 1,</u>
Title, after "REEL" insert -- ASSEMBLY --.

<u>Column 1,</u>
Line 48, delete "that" and insert -- than --.

<u>Column 5,</u>
Line 2, delete "instanteously" and insert -- instantaneously --.
Line 9, delete "continuing" and insert -- Continuing --.

<u>Column 7,</u>
Line 59, before "series" insert -- a --.

Signed and Sealed this

Seventh Day of January, 2003

JAMES E. ROGAN
*Director of the United States Patent and Trademark Office*